(12) United States Patent
Jacobsthal et al.

(10) Patent No.: US 9,963,084 B2
(45) Date of Patent: May 8, 2018

(54) AGRICULTURAL VEHICLE CONSOLE TRACK SYSTEM

(71) Applicant: CNH Industrial America LLC, New Holland, PA (US)

(72) Inventors: Eric M. Jacobsthal, Elmhurst, IL (US); David G. Lutz, New Holland, PA (US); Aaron R. Richard, Berwyn, IL (US); David C. Sachtleben, Bolingbrook, IL (US); Carl J. Hagele, The Villages, FL (US); William K. Dooley, Romeoville, IL (US); Peter J. Zerillo, Chicago, IL (US); Steve S. Savov, Algonquin, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 14/421,859

(22) PCT Filed: Aug. 16, 2013

(86) PCT No.: PCT/US2013/055416
§ 371 (c)(1),
(2) Date: Feb. 16, 2015

(87) PCT Pub. No.: WO2014/028874
PCT Pub. Date: Feb. 20, 2014

(65) Prior Publication Data
US 2015/0217702 A1    Aug. 6, 2015

Related U.S. Application Data

(60) Provisional application No. 61/742,684, filed on Aug. 16, 2012.

(51) Int. Cl.
*B60R 11/02* (2006.01)
*B60N 2/46* (2006.01)
(Continued)

(52) U.S. Cl.
CPC .......... *B60R 11/0229* (2013.01); *A01D 41/12* (2013.01); *B60N 2/4693* (2013.01);
(Continued)

(58) Field of Classification Search
CPC ......... B60R 11/0229; B60R 2011/0003; B60R 2011/0007; B60R 2011/0014;
(Continued)

(56) References Cited

U.S. PATENT DOCUMENTS 4,640,542 A * 2/1987 Watjer ................ B60R 11/0241
224/539
5,180,089 A    1/1993 Suman
(Continued)

*Primary Examiner* — Laura Freedman
(74) *Attorney, Agent, or Firm* — Patrick M. Sheldrake

(57) ABSTRACT

An agricultural vehicle including a chassis, a cab attached to the chassis, a seat positioned in the cab, a console associated with the seat and a track system coupled to the console. The track system includes a track and a display device. The track is connected to the console, and the track has first and second features. The display device is movingly coupled to the first feature and to the second feature. The display device is configured to be pushed along the track.

7 Claims, 6 Drawing Sheets

(51) Int. Cl.
  *A01D 41/12* (2006.01)
  *H04N 5/655* (2006.01)
  *B60R 11/00* (2006.01)
(52) U.S. Cl.
  CPC ...... *H04N 5/655* (2013.01); *B60R 2011/0003* (2013.01); *B60R 2011/008* (2013.01)
(58) Field of Classification Search
  CPC .. B60R 2011/008; H04N 5/655; A01D 41/12; B60N 2/4693
  See application file for complete search history.

(56) References Cited

U.S. PATENT DOCUMENTS

| | | | | |
|---|---|---|---|---|
| 5,673,628 | A * | 10/1997 | Boos | B60N 3/001 108/138 |
| 5,765,736 | A * | 6/1998 | Fischer | B60N 3/102 224/281 |
| 5,847,685 | A | 12/1998 | Otsuki | |
| 5,890,562 | A * | 4/1999 | Bartels | B60N 2/4693 180/321 |
| 5,924,515 | A | 7/1999 | Stauffer | |
| 6,039,141 | A | 3/2000 | Denny | |
| 6,321,960 | B1 | 11/2001 | Ellis | |
| 6,381,133 | B1 | 4/2002 | Chen | |
| 6,715,269 | B2 | 4/2004 | Nanlawala et al. | |
| 6,719,343 | B2 * | 4/2004 | Emerling | B60N 2/4686 224/539 |
| 6,752,444 | B2 * | 6/2004 | Kitano | B60R 7/04 296/184.1 |
| D497,394 | S * | 10/2004 | Svanson | D21/329 |
| 6,921,118 | B2 * | 7/2005 | Clark | B60N 2/4686 296/24.34 |
| 7,011,273 | B1 * | 3/2006 | Stanford | B60N 3/102 224/275 |
| 7,389,845 | B2 * | 6/2008 | Longueville | B60N 2/4606 180/326 |
| 7,460,187 | B2 | 12/2008 | Schedivy | |
| 7,537,258 | B2 | 5/2009 | Quijano et al. | |
| 8,061,671 | B2 * | 11/2011 | Mahaffy | B60N 2/468 248/222.12 |
| 8,430,370 | B2 * | 4/2013 | Steege | B60R 11/0235 248/292.14 |
| 8,646,826 | B2 | 2/2014 | Wihinen et al. | |
| 8,888,147 | B2 * | 11/2014 | Blanck | B60R 7/04 292/34 |
| 8,944,395 | B2 * | 2/2015 | Bonito | B60R 11/0235 248/276.1 |
| 9,056,587 | B2 * | 6/2015 | Montgomery | B60R 11/0229 |
| 9,132,788 | B2 * | 9/2015 | Karsch | B60K 35/00 |
| D748,566 | S * | 2/2016 | Jacobsthal | D12/415 |
| 2002/0066392 | A1 * | 6/2002 | Calam | B60N 2/468 108/33 |
| 2003/0234550 | A1 * | 12/2003 | Brooks | B60N 2/4646 296/24.46 |
| 2014/0320768 | A1 * | 10/2014 | Hagiwara | B60K 35/00 349/12 |

* cited by examiner

AGRICULTURAL VEHICLE CONSOLE TRACK SYSTEM

This application is the U.S. National Stage filing of International Application Serial No. PCT/US2013/055416 filed on Aug. 16, 2013 which claims priority to U.S. Provisional Patent Application No. 61/742,684 filed Aug. 16, 2012, each of which is hereby incorporated by reference in its entirety.

BACKGROUND OF THE INVENTION

1. Field of the Invention

The present invention relates to agricultural vehicles such as combines, and, more particularly, to the presentation of display devices in agricultural vehicles.

2. Description of the Related Art

An agricultural harvester known as a "combine" is historically termed as such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Typical combines have a cab, which is environmentally controlled for the comfort of the operator. The cab has a seat and various control systems that are conveniently presented for use by the operator. A combine has multiple uses having the ability to harvest a variety of crops. Each crop may require the adjustment of some of the systems on the combine to accommodate the particular attributes of that particular crop. Adaptive display techniques have been used to present to the operator the data most pertinent to the harvesting operation that is being undertaken. Display devices also provide the ability for the operator to select what is displayed and to control functions of the combine.

The positioning of display devices can be an important part of enhancing the work environment for the operator. Part of the positioning of a display device may be to move the device to a position where it has enhanced or diminished visibility, depending upon the current operation being undertaken. For example, if the operator is monitoring attributes of the harvested crop the operator will want the display up front and in a visible location. However if the combine is traveling down a road the display may be of little concern.

Accordingly, what is needed in the art is a display presentation system that allows quick, intuitive and efficient movement of the display device in the cab of a combine.

SUMMARY OF THE INVENTION

The present invention provides a device to position and adjust a display device associated with a console in the cab of an agricultural vehicle.

The invention in one form is directed to an agricultural vehicle including a chassis, a cab attached to the chassis, a seat positioned in the cab, a console associated with the seat and a track system coupled to the console. The track system includes a track and a display device. The track is connected to the console, and the track has first and second features. The display device is movingly coupled to the first feature and to the second feature. The display device is configured to be pushed along the track.

The invention in another form is directed to a display system connected to a console in a cab of an agricultural vehicle. The display system includes a track and a display device. The track is connected to the console, and the track has first and second features. The display device is movingly coupled to the first feature and to the second feature. The display device is configured to be pushed along the track.

An advantage of the present invention is that a display can be easily moved into view or out of view.

Another advantage is that the display is moved around the periphery of a console.

Yet another advantage is that the display maintains its height relative to the console.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
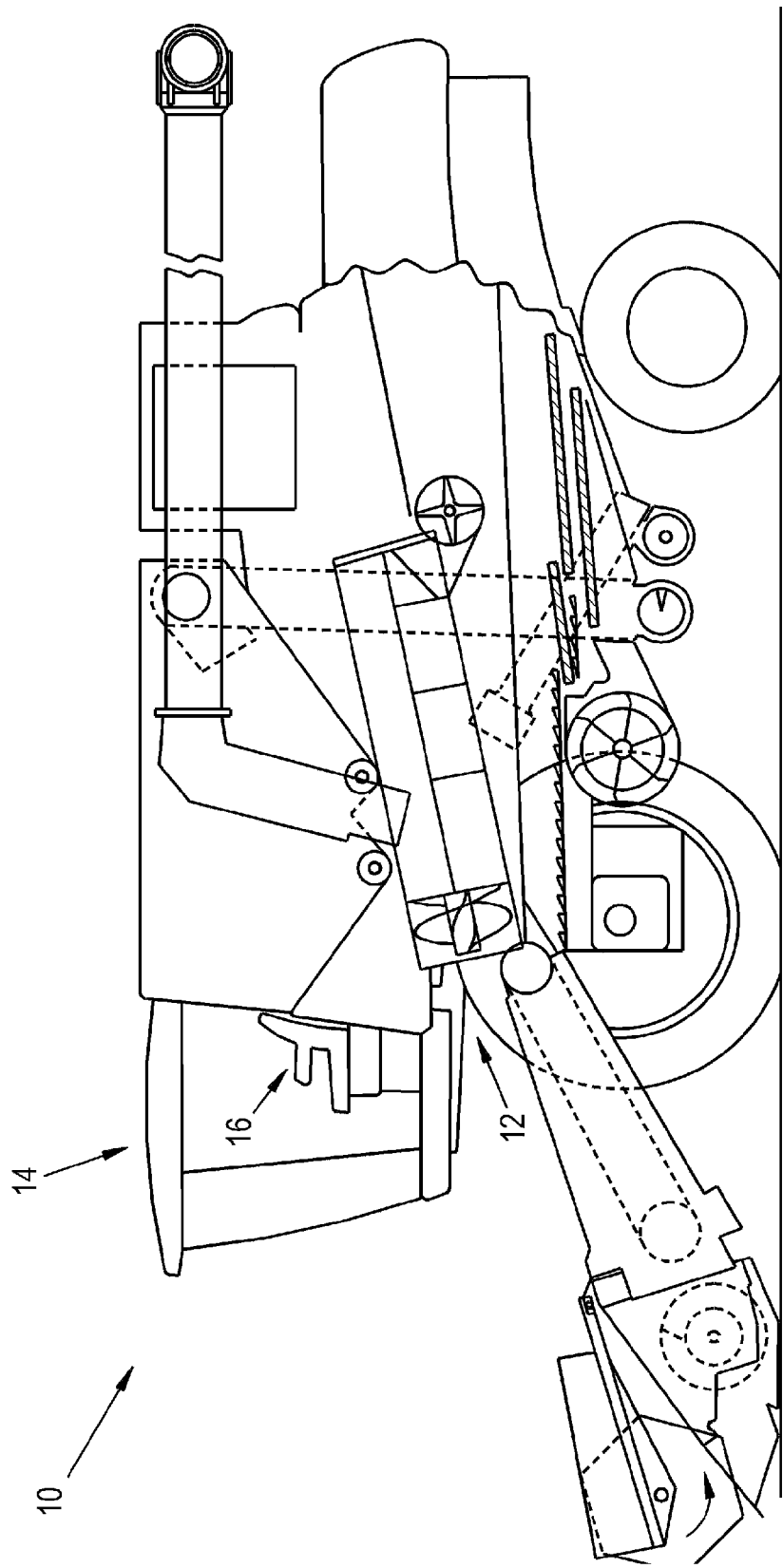
FIG. 1 is a side view of an embodiment of an agricultural harvester in the form of a combine which may include a track assembly of the present invention connected to a console in the cab of the combine.
Figure 2:
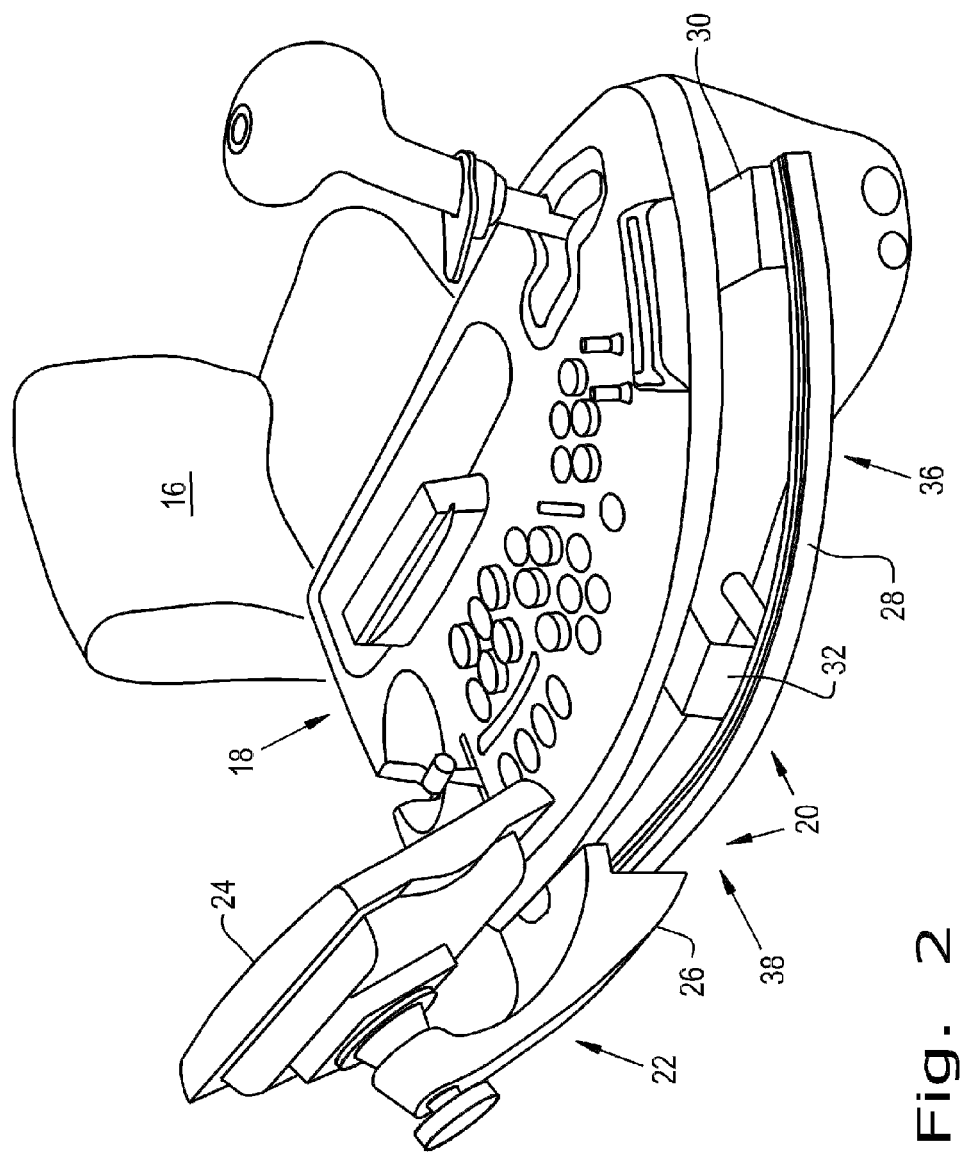
FIG. 2 is a perspective view of the console contained in the cab of the combine of FIG. 1.

Referring now to the drawings, and more particularly to FIGS. 1 and 2, there is shown an agricultural vehicle 10 in the form of a combine 10 having a chassis 12 and a cab 14. Within cab 14 there is located a seat 16 having a console 18 with a track system 20 coupled thereto. Track system 20, which can also be considered a display system 20, includes a display device 22 and a track 28. Display device 22 includes a display screen 24 and a carriage 26 that is coupled to track 28. Display screen 24 may not only display information for the operator, but may allow commands to be entered by way of an interface, such as a touch screen. Carriage 26 and track 28 cooperate to allow display device 22 to be moved along track 28 thereby allowing an operator to position display device 22 in a selectable position relative to console 18.

Figure 3:
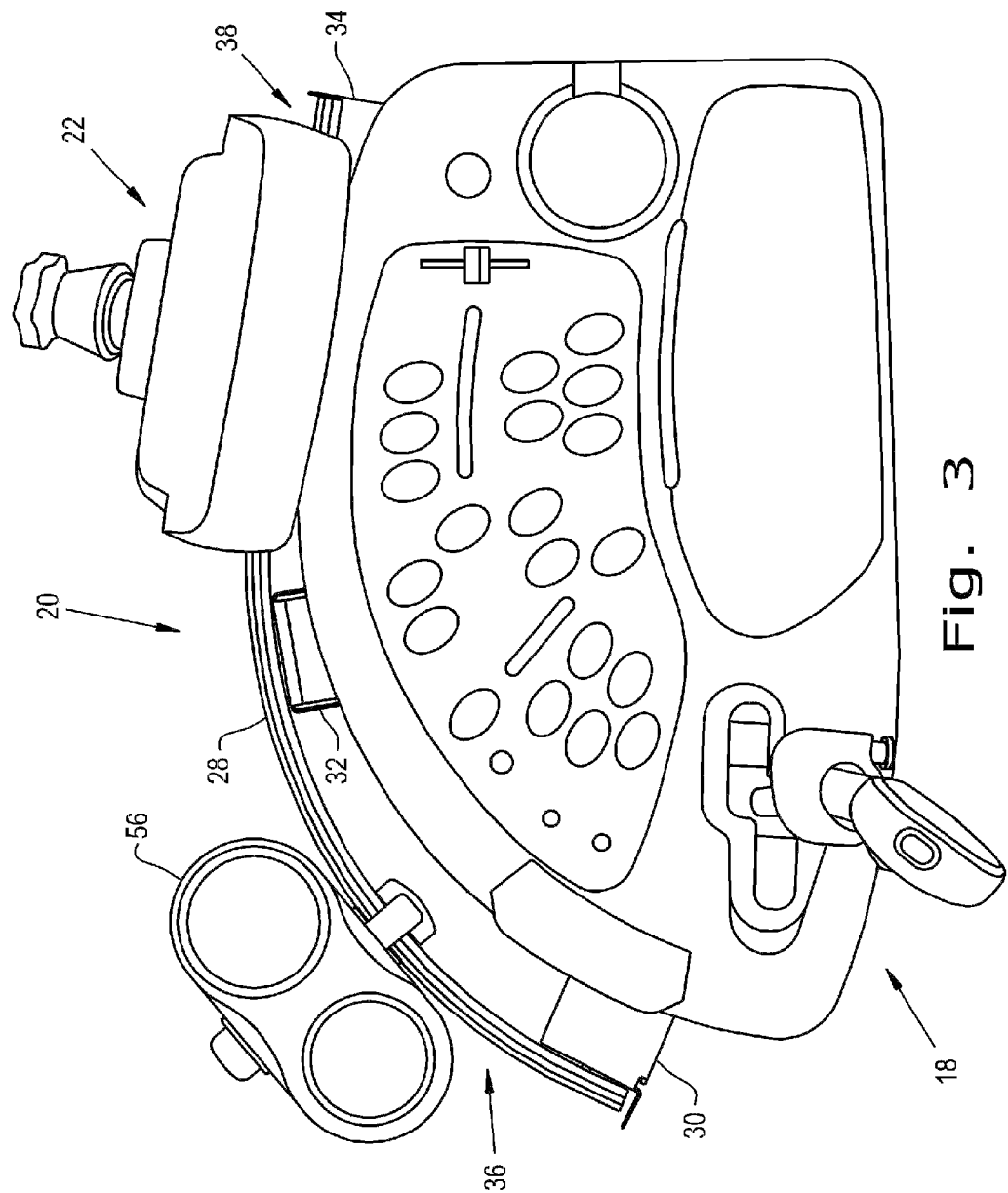
FIG. 3 is a top view of the console of FIG. 2.
Figure 4:
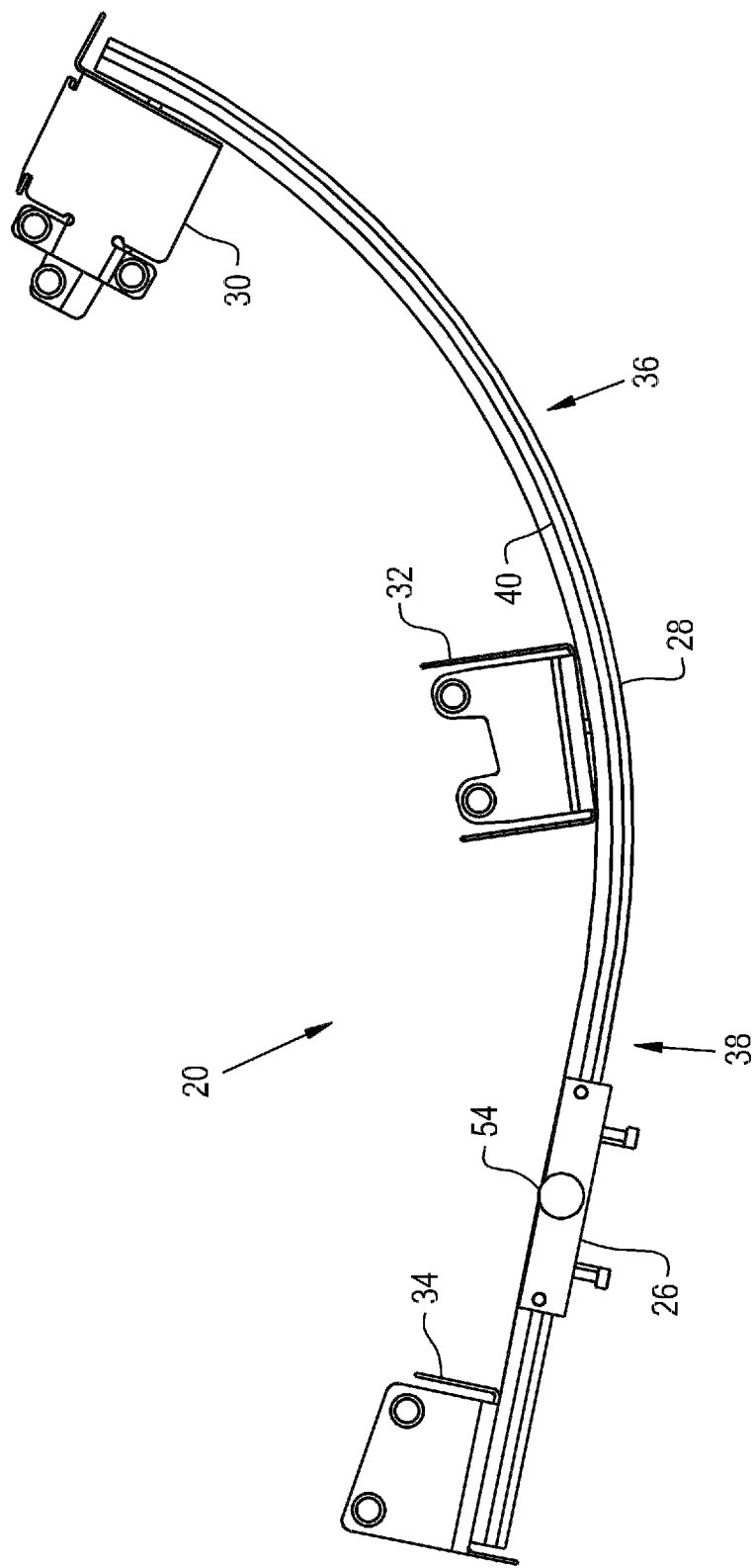
FIG. 4 is a top view of the track assembly of FIGS. 2 and 3.
Figure 5:
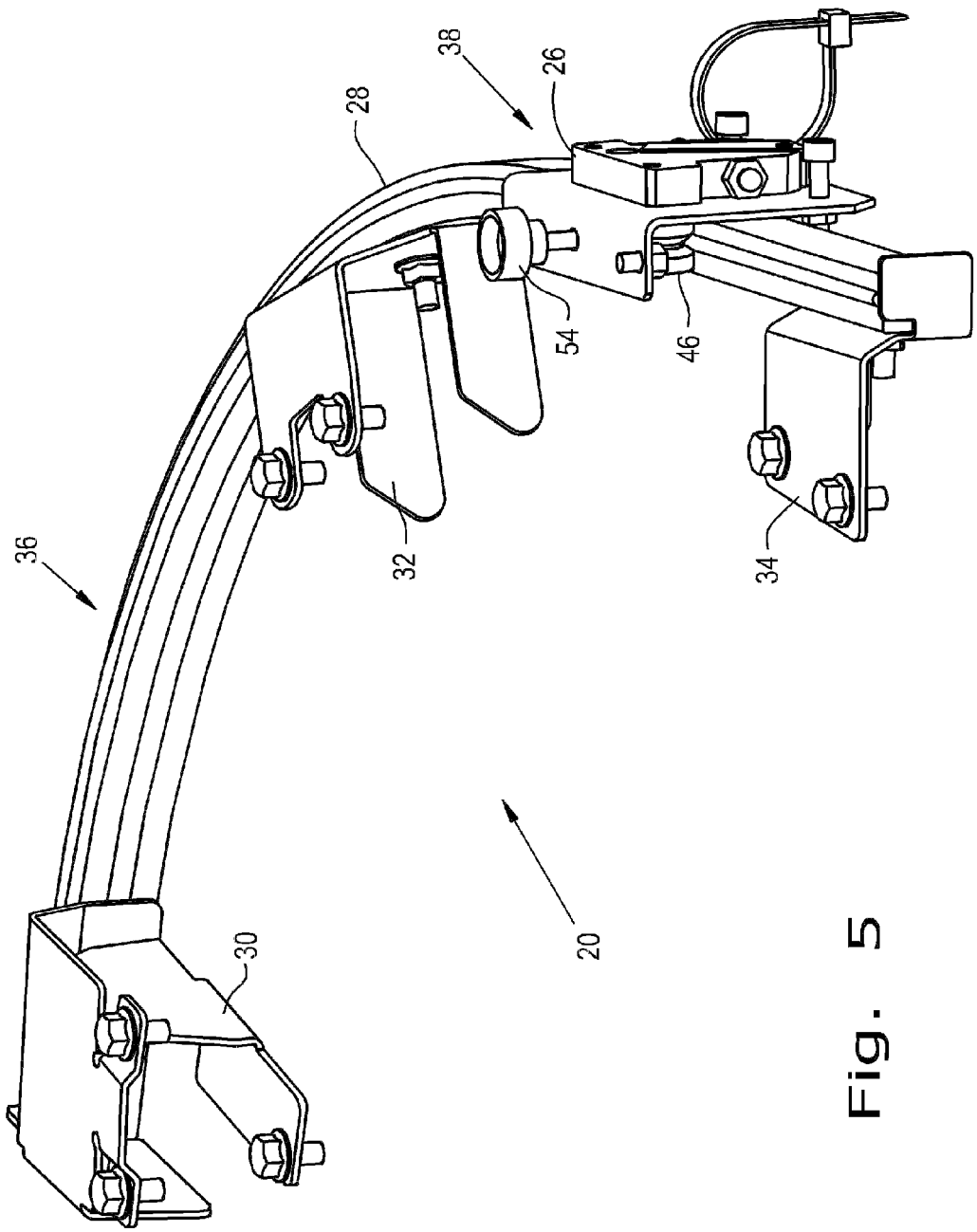
FIG. 5 is a perspective view of the track assembly of FIGS. 2-4.

Now additionally referring to FIGS. 3-5, additional views of console 16 and details of track system 20 are illustrated. Track system 20 additionally includes mounts 30, 32 and 34, which couple track 28 to console 18, yet allow carriage 26 to move along track 28 in an unhindered manner. At the two ends of track 28 stopping features are installed to prevent carriage 26 from leaving track 28. Track 28 has a curved portion 36 and a substantially linear portion 38, with carriage 26 accommodating portions 36 and 38 as carriage moves along each portion and where portion 36 transitions to portion 38. For the sake of clarity carriage 26 is shown without display 24 attached in FIGS. 4 and 5.

Figure 6:
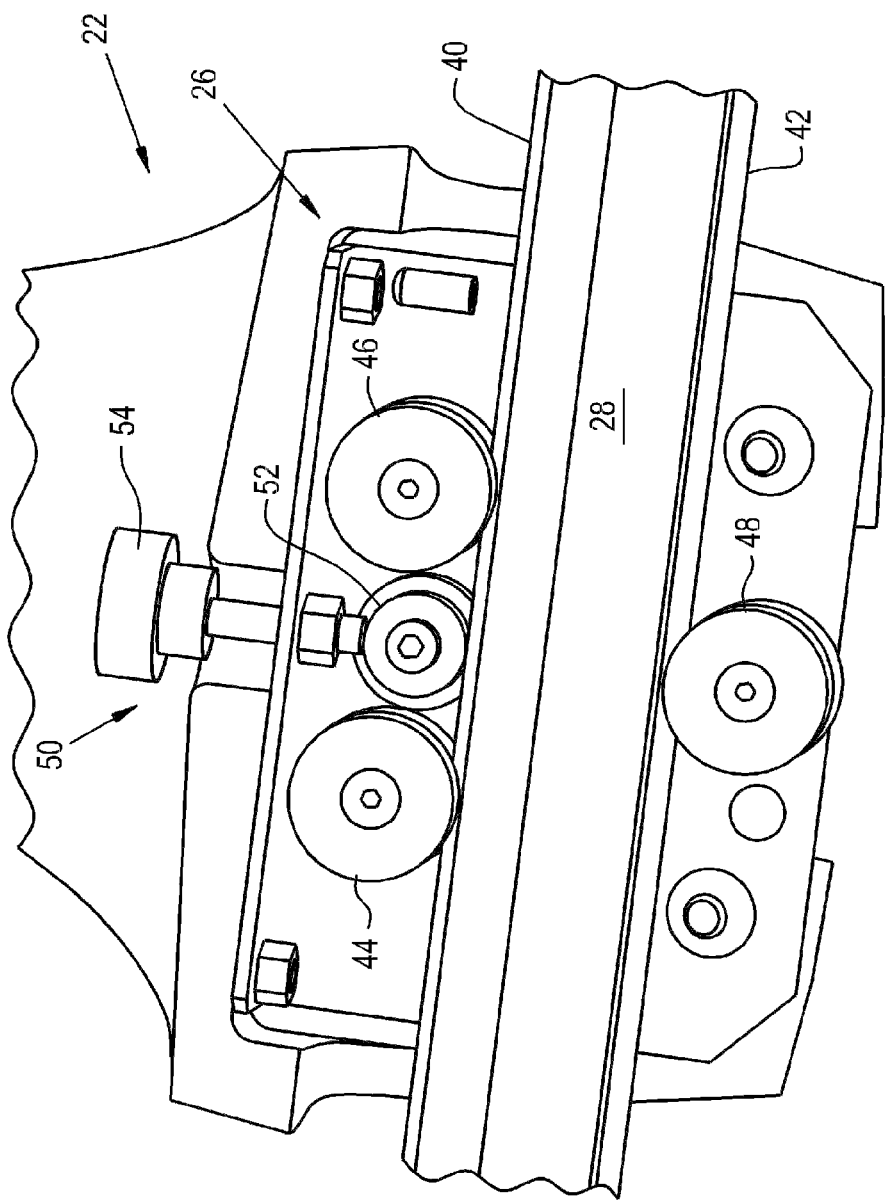
FIG. 6 is a front view of the carriage of the track assembly of FIGS. 2-5.

Now additionally referring to FIG. 6, track 28 has featured profiles on the top and bottom in the form of a top feature 40 and a bottom feature 42 illustrated herein as curved profiles extending outwardly from the main body of track 28. Other features are contemplated with carriage 26 being configured to accommodate the attributes of track 28 so that carriage 26 can be captivated on track 28 in a movable fashion.

Carriage 26 includes wheels 44, 46 and 48, and a locking device 50. Wheels 44, 46 and 48 are substantially the same having circumferential grooves in them to accommodate features 40 and 42. Other configurations of wheels 44, 46 and 48 are also contemplated to allow them to support carriage 26 in a movable manner with regard to track 28. Wheels 44, 46 and 48 are positioned so that they may or may not be in the same plane and they are separated to provide three points of contact to support carriage 26 and to allow a captivated movement of carriage 26 along track 28. Locking device 50 includes a lockable wheel 52 and a threaded knob 54. Threaded knob 54 is threaded into a portion of the body of carriage 26 and a portion extends to lockable wheel 52, so that by turning threaded knob 54 to engage wheel 52 carriage 26 will be locked into place. Lockable wheel 52 is positioned between wheels 44 and 46, and is opposite wheel 48. Lockable wheel 52 is shown in contact with track 28, and this contact is a frictional contact so that when threaded knob 54 prevents wheel 52 from rotating the movement of carriage 26 is likewise stopped. When threaded knob 54 is disengaged from lockable wheel 52, then wheel 52 rotates as carriage 26 is moved.

Advantageously track 28 can also be used to couple other device thereto. For example a cup holder 56 can engage track 28 in a fixed location. Another advantage of the present invention is that it allows for a great range of motion and works in an intuitive manner to allow the operator to move display device 22 to a location for easy reference, or to a position of lesser prominence.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
a chassis;
a cab attached to said chassis;
a seat positioned in said cab;
a console associated with said seat;
a track system coupled to said console, said track system including:
   a single track connected to said console, said track having a first feature on one side of said track and a second feature on an other side of said track; and
   a display device movingly coupled to said first feature and to said second feature, said display device being configured to be repositioned laterally along said track thereby allowing movement of said display device to a selected position along said track relative to said console;
wherein said display device includes a carriage having a plurality of wheels in contact with said track;
wherein said plurality of wheels includes to a first wheel, a second wheel, and a third wheel, said first wheel being in rolling contact with said first feature, said second wheel being in rolling contact with said second feature, said third wheel in contact with said first feature;
wherein said first feature and said second feature are each one of a profiled extension and a profiled groove of said track;
wherein said first wheel and said third wheel each have a profile to correspond to said first feature, said second wheel having a profile that corresponds to said second feature;
wherein said first feature and said second feature are each profiled extensions having a curved profile on opposite sides of said track, said first wheel and said third wheel being on opposite sides of said track from said second wheel.

2. The agricultural vehicle of claim 1, wherein said carriage further comprises a locking device connected to said carriage.

3. The agricultural vehicle of claim 1, wherein said track has a curved portion in a generally horizontal plane and a substantially linear portion.

4. An agricultural vehicle, comprising:
a chassis;
a cab attached to said chassis;
a seat positioned in said cab;
a console associated with said seat;
a track system coupled to said console, said track system including:
   a single track connected to said console, said track having a first feature on one side of said track and a second feature on an other side of said track; and
   a display device movingly coupled to said first feature and to said second feature, said display device being configured to be pushed along said track thereby allowing movement of said display device to a selected position along said track relative to said console, said display device includes a carriage having a plurality of wheels in contact with said track;
said plurality of wheels includes a first wheel and a second wheel, said first wheel being in rolling contact with said first feature, said second wheel being in rolling contact with said second feature,
wherein said plurality of wheels further includes a third wheel in contact with said first feature and said first feature and said second feature are each one of a profiled extension and a profiled groove of said track;
wherein said carriage further comprises a locking device connected to said carriage and said locking device includes a lockable wheel in contact with said track.

5. The agricultural vehicle of claim 4, wherein said lockable wheel is positioned between said first wheel and said third wheel and opposite said second wheel relative to said track.

6. A display system for use with a console installed in a cab of an agricultural vehicle, the display system comprising:
- a single track connected to said console, said track having a first feature and a second feature;
- a carriage having a plurality of wheels each being in contact with one of said first feature and said second feature of said track; and
- a display device coupled to said carriage, said display device being configured to be pushed along said track relative to said console;
- said plurality of wheels includes a first wheel and a second wheel, said first wheel being in rolling contact with said first feature, said second wheel being in rolling contact with said second feature and said plurality of wheels further includes a third wheel in contact with said first feature;
- said first feature and said second feature are each one of a profiled extension and a profiled groove of said track;
- said carriage further comprises a locking device connected to said carriage, said locking device includes a lockable wheel in contact with said track.

7. The display system of claim 6, wherein said first wheel and said third wheel each have a profile to correspond to said first feature, said second wheel having a profile that corresponds to said second feature.

\* \* \* \* \*